United States Patent
Hoffmann

(10) Patent No.: US 9,846,725 B2
(45) Date of Patent: Dec. 19, 2017

(54) SQL DOUBLE COUNTING RESOLVER

(71) Applicant: InsightSoftware.com International, Bray, County Wicklow (IE)

(72) Inventor: Stephan Hoffmann, Timmendorfer Strand (DE)

(73) Assignee: InsightSoftware.com International, Bray (IE)

( * ) Notice: Subject to any disclaimer, the term of this patent is extended or adjusted under 35 U.S.C. 154(b) by 0 days.

(21) Appl. No.: 15/469,197

(22) Filed: Mar. 24, 2017

(65) Prior Publication Data

US 2017/0322974 A1    Nov. 9, 2017

Related U.S. Application Data

(60) Provisional application No. 62/332,937, filed on May 6, 2016.

(51) Int. Cl.
*G06F 7/00* (2006.01)
*G06F 17/30* (2006.01)

(52) U.S. Cl.
CPC .. *G06F 17/30466* (2013.01); *G06F 17/30339* (2013.01); *G06F 17/30451* (2013.01)

(58) Field of Classification Search
CPC ......... G06F 17/30466; G06F 17/30451; G06F 17/30339
USPC .................................................. 707/714, 718
See application file for complete search history.

(56) References Cited

U.S. PATENT DOCUMENTS

| | | |
|---|---|---|
| 5,991,754 A | 11/1999 | Raitto et al. |
| 6,496,819 B1 | 12/2002 | Bello et al. |
| 6,775,682 B1 | 8/2004 | Ballamkonda et al. |
| 7,296,040 B2 | 11/2007 | Cazemier |
| 7,797,304 B2 | 9/2010 | Muralidhar et al. |
| 8,676,821 B2 | 3/2014 | Styles et al. |
| 9,384,256 B2 | 7/2016 | Banerjee et al. |
| 2015/0134598 A1* | 5/2015 | Banerjee ........... G06F 17/30592 707/607 |
| 2016/0154840 A1* | 6/2016 | Cazemier .......... G06F 17/30303 707/692 |

OTHER PUBLICATIONS

Camps, Dwain, "Double Counting and Sign Reversals", Retrieved from http://www.sqlservercentral.com/articles/Bin+packing/94399, Jan. 7, 2013, p. 7.
2010 version of InsightSoftware.com International product.

* cited by examiner

Primary Examiner — Van Oberly
(74) Attorney, Agent, or Firm — Neugeboren O'Dowd PC

(57) ABSTRACT

This disclosure proposes systems, methods, and apparatus that identify raw SQL queries that are likely to cause a double counting error, and if such a SQL query is identified, then convert the raw SQL query into SQL queries that account for and avoid double counting. In some embodiments, this process uses queries and subqueries that refer back to a common table expression (CTE) in order to reduce code length and increase query execution speed.

21 Claims, 13 Drawing Sheets

Main query joining all subqueries for tables 1 through n
302

> Aggregating subquery for table 1
> 304
>> Condition correcting subquery for table 1 (if applicable)
>> 308
>>> Data selection subquery (DISTINCT) for table 1 includes all joins and filters
>>> 312

• • •

> Aggregating subquery for table n
> 306
>> Condition correcting subquery for table n (if applicable)
>> 310
>>> Data selection subquery (DISTINCT) for table n includes all joins and filters
>>> 314

FIG. 3

| Common Table Expression (CTE) selecting all data, includes all joins, filters, and unique keys of tables with aggregations 402 |
|---|
| Main query joining all subqueries for tables 1 through n 404 <br><br>     Aggregating subquery for table 1 <br>     406 <br>        Data selection subquery from CTE (DISTINCT) for table 1 including condition corrections (if applicable) <br>        410 <br><br>        • • • <br><br>     Aggregating subquery for table n <br>     408 <br>        Data selection subquery from CTE (DISTINCT) for table n including condition corrections (if applicable) <br>        412 |

FIG. 4

```
502 ⎧  SELECT
   ⎪      AggInvoices.Customer as Customer,
   ⎪      AggInvoices.Amount as 'Total Amount Invoices',
   ⎪      AggPayments.Amount as 'Total Amount Payments'
   ⎪  FROM
   ⎪      504 ⎧ (SELECT
   ⎪          ⎪     RawInvoices.Customer as Customer,
   ⎪          ⎪     Sum(RawInvoices.Amount) as Amount
   ⎪          ⎪ FROM
   ⎪          ⎪     512 ⎧ (SELECT DISTINCT Invoices.Customer as Customer,
   ⎪          ⎨         ⎪                  Invoices.Amount as Amount,
   ⎪          ⎪         ⎨                  Invoices.InvoiceID AS PK_ID
   ⎪          ⎪         ⎪ FROM Invoices LEFT OUTER JOIN Payments
   ⎪          ⎪         ⎪     ON Invoices.InvoiceID = Payments.InvoiceID
   ⎪          ⎪         ⎩ ) as RawInvoices
   ⎪          ⎪ GROUP BY RawInvoices.Customer
   ⎨          ⎩ ) as AggInvoices
   ⎪  INNER JOIN
   ⎪      506 ⎧ (SELECT
   ⎪          ⎪     RawPayments.Customer as Customer,
   ⎪          ⎪     Sum(RawPayments.Amount) as Amount
   ⎪          ⎪ FROM
   ⎪          ⎪     514 ⎧ (SELECT DISTINCT Invoices.Customer as Customer,
   ⎪          ⎨         ⎪                  Payments.Amount as Amount,
   ⎪          ⎪         ⎨                  Payments.PaymentID AS PK_ID,
   ⎪          ⎪         ⎪                  Payments.InvoiceID as PK_INVOICEID
   ⎪          ⎪         ⎪ FROM Invoices LEFT OUTER JOIN Payments
   ⎪          ⎪         ⎪     ON Invoices.InvoiceID = Payments.InvoiceID
   ⎪          ⎪         ⎩ ) as RawPayments
   ⎪          ⎪ GROUP BY RawPayments.Customer
   ⎪          ⎩ ) as AggPayments
   ⎪      ON ISNULL(AggPayments.Customer, '---COM.D11S---Null—') =
   ⎩         ISNULL(AggInvoices.Customer, '---COM.D11S---Null—')
```

FIG. 5

```
WITH alltables_cte AS (
    SELECT
        Invoices.Customer as InvoiceCustomer,
        Invoices.Amount as InvoiceAmount,
        Payments.Amount as PaymentsAmount,
        Invoices.InvoiceID AS PK_INVOICE_ID,
        Payments.ID AS PK_PAYMENTS_ID
    FROM Invoices LEFT OUTER JOIN Payments
                ON Invoices.InvoiceID = Payments.InvoiceID)
SELECT
    AggInvoices.Customer as Customer,
    AggInvoices.Amount as 'Total Amount Invoices',
    AggPayments.Amount as 'Total Amount Payments'
FROM
    (SELECT
        RawInvoices.Customer as Customer,
        Sum(RawInvoices.Amount) as Amount
    FROM
        (SELECT DISTINCT InvoiceCustomer as Customer,
                        InvoiceAmount as Amount,
                        PK_INVOICE_ID
        FROM alltables_cte
        ) as RawInvoices
    GROUP BY RawInvoices.Customer
    ) as AggInvoices
    INNER JOIN
    (SELECT
        RawPayments.Customer as Customer,
        Sum(RawPayments.Amount) as Amount
    FROM
        (SELECT DISTINCT InvoiceCustomer as Customer,
                        PaymentsAmount as Amount,
                        PK_PAYMENTS_ID
        FROM alltables_cte
        ) as RawPayments
    GROUP BY RawPayments.Customer
    ) as AggPayments
    ON ISNULL(AggPayments.Customer, '---COM.D11S---Null—') =
        ISNULL(AggInvoices.Customer, '---COM.D11S---Null—')
```

Labels: 602, 604, 606, 608, 610, 612

FIG. 6

```
        ┌ SELECT
        │       AggInvoices.Customer as Customer,
        │       AggInvoices.Amount as 'Total Amount Invoices',
        │       AggPayments.Amount as 'Total Amount Payments'
        │       AggInvoices.CondAmount as 'Total Amount Invoices (Cond)', AggInvoices.CondInd as 'Total
        │       Amount Invoices (Ind)'
        │ FROM
        │       ┌ (SELECT
        │       │       CondInvoices.Customer as Customer,
        │       │       Sum(CondInvoices.Amount) as Amount
        │       │       Sum(CondInvoices.CondAmount) as CondAmount, Sum(CondInvoices.CondInd) as
        │       │       CondInd
        │       │ FROM
        │       │       ┌ (SELECT RawInvoices.Customer as Customer,
        │       │       │         RawInvoices.Amount as Amount,
        │       │       │         CASE WHEN SUM(RawInvoices.CondInd) = 0
        │       │       │                 THEN SUM(RawInvoices.CondAmount)
        │       │       │                 ELSE SUM(RawInvoices.CondAmount) /
        │       │       │                         SUM(RawInvoices.CondInd) END as CondAmount,
        │       │       │         CASE WHEN SUM(RawInvoices.CondInd) = 0
        │       │       │                 THEN SUM(RawInvoices.CondInd)
        │       │       │                 ELSE SUM(RawInvoices.CondInd) /
        │       │       │                         SUM(RawInvoices.CondInd) END as CondInd
        │       │       │ FROM
        │       │  708 ┤       ┌ (SELECT DISTINCT Invoices.Customer as Customer,
        │       │       │       │                 Invoices.Amount as Amount,
  702 ┤ │       │       │                 CASE WHEN Payments.Date > '01/10/2016'
        │       │       │       │                         THEN Invoices.Amount END as
        │       │       │       │                         CondAmount,
        │       │       │  712 ┤         CASE WHEN Payments.Date > '01/10/2016'
        │  704 ┤       │       │                         THEN 1
        │       │       │       │                         ELSE 0 END as CondInd,
        │       │       │       │                 Invoices.ID AS PK_ID
        │       │       │       │ FROM Invoices LEFT OUTER JOIN Payments
        │       │       │       │         ON Invoices.ID = Payments.InvoiceID
        │       │       │       └ ) as RawInvoices
        │       │       │ GROUP BY RawInvoices.Customer, RawInvoices.Amount
        │       │       └ ) AS CondInvoices
        │       │ GROUP BY CondInvoices.Customer
        │       └ ) as AggInvoices
        │ INNER JOIN
        │       ┌ (SELECT
        │       │       RawPayments.Customer as Customer,
        │       │       Sum(RawPayments.Amount) as Amount
        │       │ FROM
        │       │       ┌ (SELECT DISTINCT Invoices.Customer as Customer,
        │  706 ┤       │                 Payments.Amount as Amount,
        │       │       │                 Payments.ID AS PK_ID,
        │       │  714 ┤                 Payments.InvoiceID as PK_INVOICEID
        │       │       │ FROM Invoices LEFT OUTER JOIN Payments
        │       │       │         ON Invoices.InvoiceID = Payments.InvoiceID
        │       │       └ ) as RawPayments
        │       │ GROUP BY RawPayments.Customer
        │       └ ) as AggPayments
        │       ON ISNULL(AggPayments.Customer, '---COM.D11S---Null---') =
        └               ISNULL(AggInvoices.Customer, '---COM.D11S---Null---')
```

FIG. 7

```
802 {   WITH alltables_cte AS (
            SELECT
                Invoices.Customer as InvoiceCustomer,
                Invoices.Amount as InvoiceAmount,
                Payments.Amount as PaymentsAmount,
                CASE WHEN Payments.Date > '01/10/2016'
                    THEN Invoices.Amount END as CondAmount,
                CASE WHEN Payments.Date > '01/10/2016'
                    THEN 1 ELSE 0 END as CondInd,
                Invoices.InvoiceID AS PK_INVOICE_ID,
                Payments.PaymentID AS PK_PAYMENTS_ID
            FROM Invoices LEFT OUTER JOIN Payments
                    ON Invoices.PaymentID = Payments.InvoiceID)

804 {   SELECT
            AggInvoices.Customer as Customer,
            AggInvoices.Amount as 'Total Amount Invoices',
            AggPayments.Amount as 'Total Amount Payments',
            AggInvoices.CondAmount as 'Total Amount Invoices (Cond)',
            AggInvoices.CondInd as 'Total Amount Invoices (Ind)'
        FROM
    806 {   (SELECT RawInvoices.Customer as Customer,
                    Sum(RawInvoices.Amount) as Amount,
                    Sum(RawInvoices.CondAmount) as CondAmount,
                    Sum(RawInvoices.CondInd) as CondInd
                FROM
        810 {       (SELECT DISTINCT
                        InvoiceCustomer as Customer,
                        InvoiceAmount as Amount,
                        SUM(CondAmount) / ISNULL(NULLIF(SUM(CondInd), 0), 1)
                            as CondAmount,
                        SUM(CondInd) / ISNULL(NULLIF(SUM(CondInd), 0), 1)
                            as CondInd,
                        PK_INVOICE_ID
                    FROM alltables_cte
                    GROUP BY InvoiceCustomer,
                            InvoiceAmount,
                            PK_INVOICE_ID
                    ) as RawInvoices
                GROUP BY RawInvoices.Customer
                ) as AggInvoices
            INNER JOIN
    808 {   (SELECT RawPayments.Customer as Customer,
                    Sum(RawPayments.Amount) as Amount
                FROM
        812 {       (SELECT DISTINCT InvoiceCustomer as Customer,
                            PaymentsAmount as Amount,
                            PK_PAYMENTS_ID
                    FROM alltables_cte
                    ) as RawPayments
                GROUP BY RawPayments.Customer
                ) as AggPayments
            ON ISNULL(AggPayments.Customer, '---COM.D11S---Null—') =
                ISNULL(AggInvoices.Customer, '---COM.D11S---Null—')
```

FIG. 8

SQL DOUBLE COUNTING RESOLVER

CLAIM OF PRIORITY UNDER 35 U.S.C. §119

The present Application for Patent claims priority to Provisional Application No. 62/332,937 entitled "SQL Double Counting Resolver" filed May 6, 2016, and assigned to the assignee hereof and hereby expressly incorporated by reference herein.

FIELD OF THE DISCLOSURE

The present disclosure relates generally to SQL queries. In particular, but not by way of limitation, the present disclosure relates to systems, methods and apparatuses for modifying raw SQL queries to avoid double counting.

DESCRIPTION OF RELATED ART

When using SQL aggregations it might not be immediately obvious that there is a potential problem that can lead to the user seeing aggregated numbers incorrectly. It is best described using an example. Assume there is an Invoices and a Payments table. Business logic says there can be any number of payments per invoice, but only one invoice per payment. A user, who might not be intimately familiar with the underlying SQL behind a query, might ask the following question: "Show me the total of all invoices and payments I have for each customer."

When written with simple SQL aggregations, like illustrated in Appendix 2a: User's Intent, the result is incorrect: the returned aggregated invoice amount is not correct for all customers. This is caused by the data relationship: many payments for one invoice. Each payment is joined to the full invoice amount before aggregation. When aggregating the joined data the invoice amount gets aggregated multiple times.

This is the Double Counting Challenge. Detecting data relationships that lead to double counting and efficient handling of such situations prevents the user from seeing inaccurate aggregations due to multiple countings of certain values.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a system comprising a double counting resolver module configured for storage on a memory and configured to execute on a processing portion. The module can be configured to receive at a first input a request to execute a raw SQL query requesting a new report or modification to an existing report. The raw SQL query can be configured to access one or more source data tables in a database. The module can further be configured to scan the raw SQL query and identify columns in the one or more source data tables that will see double counting aggregation errors when the raw SQL query is run on them. The module can yet further be configured to generate a modified SQL query that achieves an intent of the raw SQL query but without the double counting aggregation errors. The modified SQL can cause the processor to (1) form a common table expression (CTE) by: joining the one or more source data tables to form a CTE joined table; and creating the CTE as a selection from the CTE joined table. The modified SQL can also cause the processor to (2) perform sub queries to the CTE, which can include performing a data selection sub query for each source data table, and selecting non-repeating rows for each source data table from the CTE, where each sub query produces a filtered sub query results table. This can also include performing an aggregation sub query on each of the filtered sub query results tables. Each aggregation sub query can produce an aggregated sub query results table. The modified SQL can also cause the processor to (3) join the aggregated sub query results tables to form an aggregated joined table. The modified SQL can yet further cause the processor to (4) perform a main query for columns from the aggregated joined table for return as the final results set.

Other embodiments of the disclosure may also be characterized as a method. The method can include receiving a raw SQL query requesting a new report or modification to an existing report, where the raw SQL query is to be applied to one or more source data tables. The method can also include scanning the raw SQL query and identify columns in the one or more source tables that will see double counting aggregation errors when the raw SQL query is run on them. The method can yet further include generating a modified SQL query that achieves an intent of the raw SQL query but without the double counting aggregation errors. The method can include (1) forming a common table expression (CTE) by: joining the one or more source data tables to form a CTE joined table; and creating the CTE as a selection from the CTE joined table. The method can also include (2) performing sub queries to the CTE, which can include performing a data selection sub query for each source data table, and selecting non-repeating rows for each source data table from the CTE, where each sub query produces a filtered sub query results table. This can also include performing an aggregation sub query on each of the filtered sub query results tables. Each aggregation sub query can produce an aggregated sub query results table. The method can also include (3) joining the aggregated sub query results tables to form an aggregated joined table. The method can further include (4) performing a main query for columns from the aggregated joined table for return as the final results set.

Other embodiments of the disclosure can be characterized as a non-transitory, tangible computer readable storage medium, encoded with processor readable instructions to perform a method for modifying a SQL query to avoid double counting aggregation errors. The method can include receiving a raw SQL query requesting a new report or modification to an existing report, where the raw SQL query is to be applied to one or more source data tables. The method can also include scanning the raw SQL query and identify columns in the one or more source tables that will see double counting aggregation errors when the raw SQL query is run on them. The method can yet further include generating a modified SQL query that achieves an intent of the raw SQL query but without the double counting aggregation errors. The method can include (1) forming a common table expression (CTE) by: joining the one or more source data tables to form a CTE joined table; and creating the CTE as a selection from the CTE joined table. The method can also include (2) performing sub queries to the CTE, which can include performing a data selection sub query for each source data table, and selecting non-repeating rows for each source data table from the CTE, where each sub query produces a filtered sub query results table. This can also include performing an aggregation sub query on each of the filtered sub query results tables. Each aggregation sub query can produce an aggregated sub query results table. The method can also include (3) joining the aggregated sub query results tables to form an aggregated joined table. The method can further include (4) performing a main query for columns from the aggregated joined table for return as the final results set.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 3 illustrates a first block diagram of modified SQL that can be used to avoid double counting errors;

FIG. 4 illustrates a second block diagram of modified SQL that can be used to avoid double counting errors;

FIG. 5 illustrates an example of modified SQL that can be generated by the resolver 914;

FIG. 6 illustrates another example of modified SQL that can be generated by the resolver 914;

FIG. 7 illustrates another example of modified SQL that can be generated by the resolver 914;

FIG. 8 illustrates yet another example of modified SQL that can be generated by the resolver 914;

DETAILED DESCRIPTION

Figure 1:
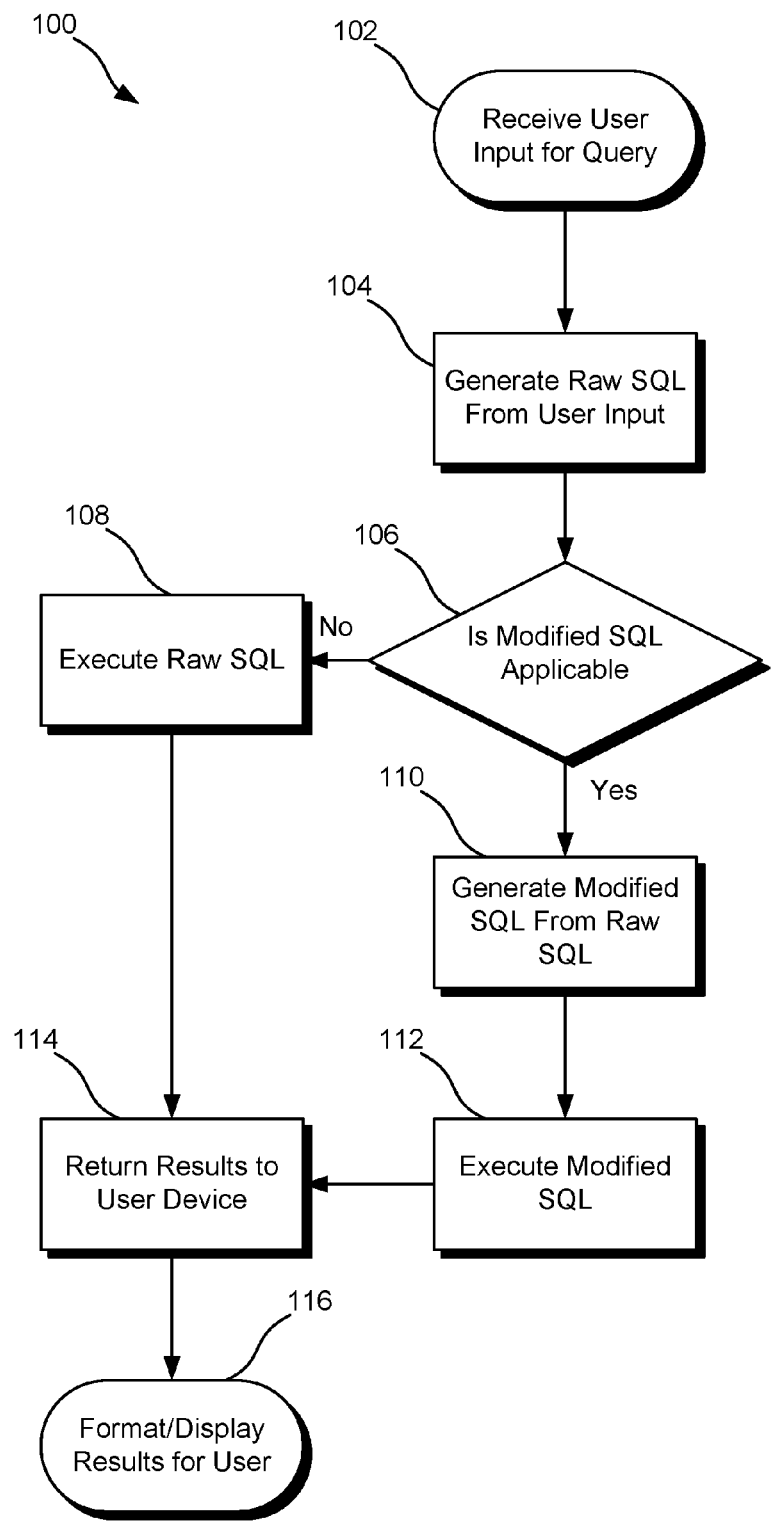
FIG. 1 illustrates a method of generating the modified SQL query from a raw SQL query.

The word "exemplary" is used herein to mean "serving as an example, instance, or illustration." Any embodiment described herein as "exemplary" is not necessarily to be construed as preferred or advantageous over other embodiments.

The present disclosure relates generally to SQL queries. In particular, but not by way of limitation, the present disclosure relates to systems, methods and apparatuses for modifying raw SQL queries into more effective SQL queries.

To solve the double counting challenge, this disclosure proposes systems, methods, and apparatus that identify raw SQL queries that are likely to cause a double counting error, and if such a SQL query is identified, then convert the raw SQL query into SQL queries that account for and avoid double counting. For the purposes of this disclosure, the input can be referred to as a "raw SQL query" or "raw SQL," and includes the SQL generated by a user input requesting a certain report or modification of a report. The output can be referred to as a "modified SQL query" or "modified SQL," and includes SQL that performs the user's intent, but without the errors caused by double counting. Both the raw SQL query and the modified SQL query produce the requested report or modification of an existing report, but the modified SQL query produces a report or modification to a report that is free from double counting errors.

The idea behind the disclosure is that it is relatively easy to produce a query that holds the un-aggregated values from all tables and the associated correctly aggregated values from one table. A set of queries can be written that produce the correct aggregations for each table. Joining those together produces the desired result or intent of the raw SQL.

All subqueries can look at the same dataset: same joins, same filters. Therefore, the data selection can be extracted from the individual table queries into a shared Common Table Expression (CTE), leaving only the column selection and aggregation to the individual table queries.

To better understand the double counting challenge, an example of a double counting error is presented (herein after referred to as the "invoices and payments example"). Assume the source data includes the following two tables: Invoices and Payments. The only common data between these two tables is the InvoiceID in the Invoices table and the InvoiceID in the Payments table. It should be noted that the "InvoiceID" column in the "Invoices" table is the same as the "InvoiceID" column in the "Payments" table.

TABLE 1

Invoices

| Invoice ID | Customer | Amount |
|---|---|---|
| 1 | Acme | 100 |
| 2 | Acme | 180 |
| 3 | Bob | 60 |

TABLE 2

Payments

| Payments ID | Invoice ID | Amount |
|---|---|---|
| 1 | 1 | 50 |
| 2 | 1 | 50 |
| 3 | 2 | 50 |
| 4 | 2 | 50 |
| 5 | 2 | 50 |
| 6 | 3 | 60 |

Suppose a user wishes to see a report showing the total amount of invoices and the total amount of payments broken down by Customer and makes a request for the same via a user interface. A reporting engine or other components can convert the user request into a raw SQL query that might appear as follows:

SELECT Invoices.Customer as 'Customer'.
    SUM(Invoices.Amount) as 'Total Amount Invoices',
    SUM(Payments.Amount) as 'Total Amount Payments'
FROM Invoices LEFT OUTER JOIN Payments
    ON Invoices.InvoiceID=Payments.InvoiceID
GROUP BY Invoices.Customer Raw SQL 1

And the report that is returned will be as follows:

TABLE 3

| Customer | Total Amount Invoices | Total Amount Payments |
|---|---|---|
| Acme | 740 | 250 |
| Bob | 60 | 60 |

While the totals for Acme's payment and Bob's invoices and payments are correct, the Total Amount Invoices for Acme is in error. The correct value should be 280 since Acme's two invoices were for 100 and 180. However, the raw SQL performs the LEFT OUTER JOIN before performing the aggregations (or SUM operation), thereby causing the amount for each of the two Acme invoices to be counted multiple times during this aggregation. This happens because the JOIN operation basically combines the Invoices and Payments tables and lines up rows of both tables where the InvoiceID from the "Invoices" table matches the InvoiceID of the "Payments" table. Thus, the LEFT OUTER JOIN leads to the following table:

TABLE 4

Invoices LEFT OUTER JOIN Payments

| Invoices ID | Customer | Amount (Inv) | Payments ID | Invoice ID | Amount (Pay) |
|---|---|---|---|---|---|
| 1 | Acme | 100 | 1 | 1 | 50 |
| 1 | Acme | 100 | 2 | 1 | 50 |
| 2 | Acme | 180 | 3 | 2 | 50 |
| 2 | Acme | 180 | 4 | 2 | 50 |
| 2 | Acme | 180 | 5 | 2 | 50 |
| 3 | Bob | 60 | 6 | 3 | 60 |

Where the first Invoices ID column comes from the Invoices table, and the second Invoice ID comes from the Payments table. Along these same lines, it should be noted that the left three columns comes from the Invoices table and the right three columns from the Payments table. Since the JOIN operation occurs first, when the aggregations (or SUM operations) occur, the Amount (Inv) for Acme equals 740, a far cry from the correct 280 value. The only reason that the total for Bob does not see a double counting error is that there is only a single payment for the invoice assigned to Bob.

Most prior art system are neither aware of the double counting challenge nor have any way to remedy the double counting error.

Solutions to the Double Counting Challenge

This disclosure suggests modifying the raw SQL query to include a SELECT DISTINCT function, among other features, to prevent the double counting seen above. At a very high level, the same JOIN is performed, but before aggregations (or SUM operations), the modified SQL query splits the joined table into two or more tables (one for each table affected by a double counting aggregations) where duplicate values are filtered out (e.g., via a SELECT DISTINCT function). Then the aggregation can go forward without risk of double counting. See FIG. 5.

Another solution performs generation of an alternative modified SQL having a form as exemplified in FIG. 6. While the modified SQL above may be acceptable where a small number of source data tables are used, when greater numbers of source data tables are used (i.e., when applying the herein disclosed solution at scale), there is a desire to reduce the system resources used by each sub query (one sub query per source data table). Thus, a second solution creates common table expressions (CTEs) as part of the modified SQL (see code at 602).

While the first embodiment relies on a LEFT OUTER JOIN for every source data table (i.e., for every sub query), the second embodiment reduces the overhead of repeated JOINs by reliance on a CTE. One can see in the second example that the LEFT OUTER JOIN is not needed, but instead the INNER JOIN is selected from the CTE (e.g., FROM alltables_cte) rather than from the Invoices LEFT OUTER JOIN payments.

Use of a CTE reduces overhead and reduce a length of the generated SQL, because the JOIN operation only need be performed once regardless of a number of sub queries. Each sub query can refer back to the CTE rather than needing a separate JOIN operation. In this way, the JOIN operation is only performed one time per query regardless of the number of sub queries performed. As seen in the second exemplary modified SQL above, the LEFT OUTER JOIN operation is part of the FROM portion of the WITH alltables_cte AS and thus only occurs one time during any query. Each sub query (there are two sub queries within the FROM component of the WITH alltables_cte AS) refers back to the CTE (e.g., FROM alltables_cte) without having to perform separate JOIN operations for each sub query. This greatly improves the speed and memory usage of the modified SQL query.

It should be noted in the example that the two subqueries begin at (SELECT RawInvoices.Customer as Customer, and (SELECT RawPayments.Customer as Customer.

While some may mistake a recursive CTE (or rCTE) with the herein disclosed, CTE, the two are distinct, as is apparent to those of skill in the art. For instance, Dwain Camps, on sqlservercentral.com, explains how a recursive CTE or rCTE can be used to address double counting errors when summing summary transactions (e.g., aggregations of aggregations). See http://www.sqlservercentral.com/articles/Bin+packing/94399/. Yet, Mr. Camps' approach accepts the existence of duplicate values, identifies them after aggregation, and then excludes them-which is the byproduct of using an rCTE. In contrast, the current disclosure identifies and excludes duplicates prior to aggregation. The result is a greatly simplified SQL and improved computer operation.

Figure 2:
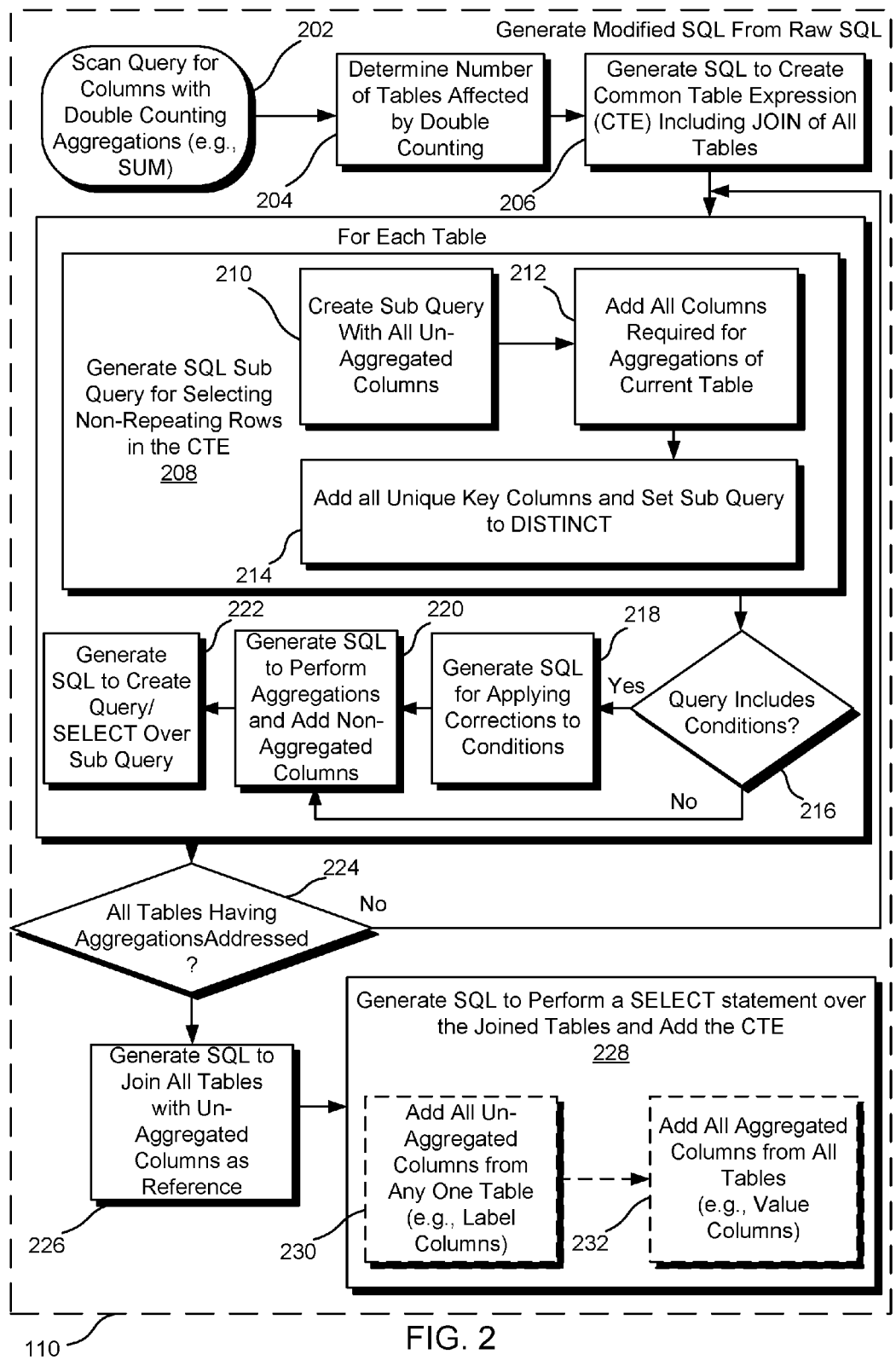
FIG. 2 illustrates detail of the generate modified SQL from raw SQL operation 110 in FIG. 1.

FIGS. 1 and 2 present a method for generating the modified SQL query from a raw SQL query. The method 100 begins by receiving a user input for a query via a user device (e.g., a user inputting text into a user interface or clicking on an icon or symbol) (Block 102). The method 100 then generates raw SQL from the user input (Block 104). The method 100 then determines if the modified SQL is applicable (Decision 106). If not, then the method 100 executes the raw SQL (Block 108) and returns the results to the user device (Block 114). The user device then formats the results and displays them (Block 116).

Going back to Decision 106, if the method 100 determines that the raw SQL will generate a double counting error, then the method 100 generates a modified SQL from the raw SQL (Block 110). Details of this generation operation (Block 110) are provided in FIG. 2. The method 100 can then execute the modified SQL (Block 112) instead of the raw SQL, return the results to the user device (Block 114), and format and display the results on the user device (Block 116).

Returning to Decision 106, there are a number of primary indicators that the modified SQL may not be applicable. First, if the Decision 106 determines that the raw SQL will not result in a double counting error, than there is no need to generate the modified SQL. This can be indicated by the raw SQL query including only a single table or including tables that do not have any aggregations. Another indicator is that the raw SQL query does not contain at least one table forming a "one-to-many" or "many-to-one" data relationship with the table that suffers from a double counting error.

FIG. 2 provides a detailed look at the generation of the modified SQL from the raw SQL. Operation 110 can start by scanning the raw SQL query to see if any columns in the raw SQL query include double counting aggregations (e.g., SUM operations from other tables) (Block 202). In particular, Block 202 checks the data relationships of each table to all other tables in the query. This is done by comparing primary keys against the join criteria. If those relationships determine a one-to-many or many-to-many relationship between the table in question and any other table, then the column is identified as being affected by a double counting aggregation. Some query functions that can be used to more easily identify when a double counting aggregation is not a threat, are as follows: MIN( . . . ); MIN(DISTINCT . . . ); MAX( . . . ); MAX(DISTINCT . . . ); SUM(DISTINCT . . . ); COUNT(DISTINCT . . . ); and AVG(DISTINCT . . . ). For instance, where a DISTINCT function is used, all duplicate rows are eliminated from the resulting selection or results and thus no double counting error is possible for these functions. A sub-select, to be discussed below, is only created for those tables that are found to have at least one column affected by a double counting error.

Said another way: scanning checks aggregations that are affected by double counting. Any aggregation that is unaffected will be treated as an un-aggregated column and will therefore be present on all table queries. A table with only unaffected aggregations will not trigger a table query.

Tables having at least one column affected by a double counting aggregation can then be counted (Block 204) (e.g., two in the example in the Appendices). However, in practice many more than two source data tables affected by double counting are often seen. The operation 110 then generates a portion of the modified SQL that will be responsible for creating the common table expression (CTE) including a JOIN operation applied to all sub queries (Block 206). In creating the CTE, no columns are added twice, and source data tables that do not have unique keys will not be added to the CTE. Unique keys for a table can be found by querying the source table, through explicitly defining the unique keys for each table, and/or by querying table metadata from the DBMS (e.g., 904, 1004). In some embodiments, where a source data table does not have unique keys, a second CTE can be created containing all columns requested by the raw SQL query, but stripped of any aggregations (virtually identical to the first CTE). However, unlike the first CTE, a "Table.*" expression is added to the second CTE instead of the unique keys that were added to the first CTE. The "Table.*" expression in SQL means to select all columns from a given table. The use of a SELECT DISTINCT function here effectively returns a unique set of rows which are no longer affected by double counting. —Future references to the first CTE are instead made to the second CTE. An example of modified SQL for creating the CTE for the Payments and Invoices example noted above can be seen in block 602 in FIG. 6.

Said another way: the CTE will get the joins and filters from the source query. It will add: all un-aggregated columns, inspect all aggregated columns, and add the columns they aggregate all unique key columns. Columns will not be added multiple times. Tables without unique keys will not be added to the main CTE.

Also, regarding the joins, all individual table subqueries select all un-aggregated columns. Joining them will produce the desired result, but the join needs to be made such that "null=null" is also true. This is achieved by wrapping the join columns in an ISNULL function with an appropriate default.

The operation 110 can then create SQL for addressing each sub query (each source data table) (e.g., Blocks 210-222 and example code at 604 in FIG. 6). So, for each source data table, the operation 110 can generate a SQL sub query for selecting non-repeating rows in the CTE (Block 208 and example code at 610, 612 in FIG. 6). This can involve generating SQL to perform a sub query for each source table of data from the CTE. This sub query can be referred to as a data selection sub query (e.g., 610 and 612) and each data selection sub query can generate a filtered sub query results table.

Each data selection sub query can be formed from all un-aggregated columns in the current table required by the raw SQL query (Block 210), all columns required for aggregation of the current source table of data corresponding to the data selection sub query (Block 212), and all unique key columns from the CTE (Block 214). As an example see the InvoiceCustomer as Customer, InvoiceAmount as Amount, PK_INVOICE_ID variables in section 610 of FIG. 6. As another example, the Customer column is the un-aggregated column, so creation of the data selection sub query would include the Customer column.

TABLE 5

| Invoices | | |
|---|---|---|
| Invoice ID | Customer | Amount |
| 1 | Acme | 100 |
| 2 | Acme | 180 |
| 3 | Bob | 60 |

TABLE 6

| Payments | | |
|---|---|---|
| Payment ID | Invoice ID | Amount |
| 1 | 1 | 50 |
| 2 | 1 | 50 |
| 3 | 2 | 50 |
| 4 | 2 | 50 |
| 5 | 2 | 50 |
| 6 | 3 | 60 |

Identifying those columns required for aggregation (Block 212) can be done via analysis of the raw SQL query. For the Invoices data selection sub query of the example, Block 212 would add the Amount column from the Invoices source data table (InvoiceAmount as Amount) to the data selection sub query, and for the Payments data selection sub query it would add the respective Amount column.

Regarding the addition of unique key columns to the data selection sub query (Block 214), the PK_INVOICE_ID column from the example CTE can be added to the Invoices data selection sub query, which corresponds to the InvoiceID column of the Invoices source data table. Similarly, for the Payments data selection sub query, the PK_PAYMENTS_ID column from the CTE can be added, which corresponds to the PaymentID column of the Payments source data table.

Given these unique key columns, each of these data selection sub queries can be set to DISTINCT or use a DISTINCT function (e.g., SELECT DISTINCT in the second example of the modified SQL, copied in FIG. 6 with bold text highlighting the SELECT DISTINCT components). The unique key columns (e.g., PK_INOVOICE_ID and PK_PAYMENTS_ID) allow the DISTINCT function to distinguish between rows in the CTE that are distinct and those that are not. For instance, see the SELECT DISTINCT function in the code sections 610 and 612 in FIG. 6.

Once Block 208 has completed creating SQL to perform the data selection sub query, the operation 110 can determine if the original query includes conditions (e.g., IF, THEN) (Decision 216). Without special handling for conditions, the results would still be erroneous. This phenomena is caused by the SQL returning a row for the THEN part of the condition—and one for the ELSE part. Because of the condition being on the many side of the join this will introduce duplicates on the one side—in this case the aggregated invoice amount is duplicated. This problem can be corrected by aggregating the conditions prior to the final aggregate. In some embodiments, corrections occurs on the query that selects the data from the CTE. Each conditional column is accompanied by an indicator column that returns a constant 1 or 0—indicating whether the conditions matched. If it doesn't exist, then it can be added, and this correction is calculated by doing:

SUM(conditional_column)/ISNULL(NULLIF(SUM(indicator_column), 0), 1)

If there are conditions, then SQL can be generated for applying corrections to the conditions (Block 218). Conditions can be identified, for instance, by looking for the functions, "CASE WHEN . . . THEN . . . ELSE . . . END." When the source data contains rows that match a condition and rows that don't match a condition, the raw SQL query will count each of these rows resulting in double counting errors. This disclosure provides a correction in the modified SQL such that the modified SQL query only accesses the rows matching the condition. In particular, the CTE can include a row for each of those rows in the source data matching the condition and a row for each row in the source data that does not match the condition. For instance, the following raw SQL could be created from a user's intent to see summations of payments and invoices before 01/10/2016.

SELECT Invoices.Customer as 'Customer',
   SUM(Invoices.Amount) as 'Total Amount Invoices',
   SUM(Payments.Amount) as 'Total Amount Payments',
   SUM(CASE
     WHEN Payments.Date>'01/10/2016'
     THEN Invoices.Amount END) as 'Total Amount Invoices (Cond)',
   SUM(CASE
   WHEN Payments.Date>'01/10/2016'
   THEN 1
   ELSE 0 END) as 'Total Amount Invoices (Ind.)'
FROM Invoices LEFT OUTER JOIN Payments
   ON Invoices.InvoiceID=Payments.InvoiceID
GROUP BY Invoices.Customer Raw SQL 2

FIG. 8 illustrates an exemplary code for the Payments and Invoices example where conditions are accounted for.

The herein disclosed systems and methods could generate a third modified SQL, as shown in the third example, FIG. 7, (as compared to the example of the second modified SQL).

However, for reduced SQL length and reduced latency, the third modified SQL can be written using a CTE, similar to FIG. 6, as seen in FIG. 8. This can be referred to as a fourth modified SQL.

Once corrections for conditions are applied (Block 218), or if none need be applied, then SQL can be generated for creating sub queries over the sub queries generated in operation 208. This sub query can be referred to as an aggregation sub query and when executed, involves an aggregation sub query that is performed on each of the filtered sub query results tables. The results of each of these aggregation sub queries is an aggregated sub query results table. These aggregation sub queries can use a SELECT expression and can involve three steps: adding/selecting aggregations, adding/selecting non-aggregated columns; and performing the SELECT expression from a filtered results table provided by the SELECT DISTINCT sub query (see Block 208). Adding/selecting aggregations means adding those columns to the SELECT expression where aggregations are to occur. In FIG. 6 this means adding the Amount column to the first sub query 606, or the Sum(RawInvoices.Amount), or the Amount column to the second sub query 608, or the Sum(RawPayments.Amount). Adding/selecting non-aggregated columns means adding those columns to the SELECT expression where no aggregations in a column are to occur (e.g., Customer columns). Performing the SELECT expression from a filtered results table means using a FROM statement in the SELECT expression, where the SELECT is FROM the filtered results table, or the results of the SELECT DISTINCT sub query. An example of the FROM statement can be seen in blocks 610 and 612 in FIG. 6.

This sub query functionality can be enabled by the SQL added via Blocks 220 and 222 in FIG. 2. In particular, Blocks 220 and 222 can generate a portion of the modified SQL that when executed, performs these three steps. In other words, the Blocks 220 and 222 create portions of the modified SQL that when executed, perform aggregation sub queries on the filtered sub query results from the SELECT DISTINCT sub queries. For instance, in FIGS. 5 and 6, SQL for performing the aggregation sub queries is located in blocks 504, 506, 606, and 608. Blocks 504 and 606 address the "Invoices" table and blocks 506 and 606 address the "Payments" table. In this example, the aggregations are performed via a SUM function in Blocks 504, 506, 606, 608.

The above operations (Block 208, 216, 218, 220, and 222) can be performed for each source data table. In the example, there are two source tables (e.g., n=2 where n represents the number of source data tables), so operations 208, 216, 218, 220, and 222 would be carried out twice (once for the Invoices table and once for the Payments table). One can also see this in the example of FIG. 6 where two aggregation sub queries are created, 606, 608, one for each of the source data tables.

Once the modified SQL has been expanded to include an aggregation sub query for each source data table that has aggregations (Decision 224), SQL can be added to the modified SQL that when executed will join the aggregated sub query results tables from the n sub queries to form a joined table (Block 226). In the examples, the INNER JOIN function between SQL blocks 606 and 608 in FIG. 6, along with the "ON" condition at the bottom of the example code, can embody one example of SQL that can be added to achieve this joining function. This joining of the aggregated sub query results tables (Block 226) can include using the un-aggregated columns as a reference. For instance, in the example, the INNER JOIN can lead to the Customer column being used as the reference column. Another way to look at this is that all aggregated sub query results tables will be joined based on label columns (e.g., Customer).

The modified SQL can also include a main query where a SELECT (e.g., 604) statement over the joined table selects columns from the joined table for return as a final results set (Block 228). For instance, in the example of FIG. 6 the main query is the SELECT statement of Block 604. Block 228 can generate SQL that when executed will perform a SELECT statement, or main query, over the joined table, where the SELECT statement references the CTE, via the SELECT DISTINCT sub query, created by the SQL of Block 206. The main query, when executed, can add all un-aggregated columns (e.g., label columns) from any one source data table (optional Block 230) to a final results set. For instance, in the payments-invoices example, the aggregation sub queries (e.g., blocks 606 and 608) form the following Table 7, the INNER JOIN function joins the aggregation sub queries to form the following joined table,

TABLE 7

| Customer | Sum Invoice Amount | Customer | Sum Payment Amount |
|---|---|---|---|
| Acme | 280 | Acme | 250 |
| Bob | 60 | Bob | 60 | and from the joined table, the main query or SELECT statement adds one of the Customer columns to the final results set (since the data is identical in both columns, only one is needed) (see Table 8).

TABLE 8

| Customer |
|---|
| Acme |
| Bob |

The main query can also add all aggregated columns from the joined table to the final results set (e.g., the first and second Sum Amount columns in the joined table of Table 7) (Block 232), such that the output of the main query or SELECT statement would be as follows in the example:

TABLE 9

| Customer | Total Amount Invoices | Total Amount Payments |
|---|---|---|
| Acme | 280 | 250 |
| Bob | 60 | 60 |

One of skill in the art will appreciate that a "SELECT statement" (Block 228) is different from a "SELECT" expression (Blocks 208, and 222) as used herein. In particular, a SELECT statement is defined as:
[WITH {[XMLNAMESPACES,] [<common_table_expression>]}]
SELECT select_list [INTO new_table]
[FROM table_source] [WHERE search_condition]
[GROUP BY group_by_expression]
[HAVING search_condition]
[ORDER BY order_expression [ASC|DESC]]
While a SELECT expression is defined as:
[TOP (expression) [PERCENT] [WITH TIES]]
<select_list>
[INTO new_table]
[FROM {<table_source>} [, ... n]]
[WHERE <search_condition>]
[<GROUP BY>]
[HAVING <search_condition>]

Thus, FIG. 2 shows how the operation 110 generates a modified SQL from the raw SQL, and when the modified SQL is executed on a processor, a table or final results set is generated that does not see double counting errors.

Conditional Queries

To better understand the conditional queries briefly noted earlier, it is useful to again turn to the Invoices and Payments example relied on earlier. Where a user wants total amounts for invoices and payments based on customer, but now wants to limit the totals to invoices having a specific date, a condition is applied to the query. For instance, if a summation of payments and invoices before 01/10/2016 is desired, then the following raw SQL might be generated by such a query:
SELECT Invoices.Customer as 'Customer',
   SUM(Invoices.Amount) as 'Total Amount Invoices',
   SUM(Payments.Amount) as 'Total Amount Payments',
   SUM(CASE
     WHEN Payments.Date>'01/10/2016'
     THEN Invoices.Amount END) as 'Total Amount Invoices (Cond)',
   SUM(CASE
     WHEN Payments.Date>'01/10/2016'
     THEN 1
     ELSE 0 END) as 'Total Amount Invoices (Ind.)'
FROM Invoices LEFT OUTER JOIN Payments
   ON Invoices.InvoiceID=Payments.InvoiceID
GROUP BY Invoices.Customer Raw SQL 2

When such a query is performed, the condition is calculated prior to aggregations, and there is thereby a double counting error. To resolve this double counting error, the inventors propose generating a modified SQL from the raw SQL where the modified SQL performs the aggregating all conditions prior to a final aggregation. This can be seen for instance, in the first modified SQL block diagram 300 of FIG. 3, and an example of actual SQL in FIG. 7 using the first modified SQL block diagram 300 and the example source date from the invoices and payments example.

The second modified SQL block diagram 400 in FIG. 4 can also account for conditions, and is exemplified in actual SQL in FIG. 8 using the second modified SQL block diagram 400 and the example source data from the Invoices and Payments example.

Comparing the example SQL where conditions are not present (FIG. 6) and the situation where conditions are present (FIG. 8), one sees that the creation of the CTE now includes "CASE WHEN" functions that thereby wrap the conditions one time into the CTE rather than carrying them out for each sub query. All conditions are addressed in the CTE and thus only have to be performed a single time when creating the CTEs rather than being performed once for each sub query. Thus, the second modified SQL 400 provides further advantage over the first modified SQL when conditions are used.

Referring back to FIG. 2, SQL to account for conditions is generated in Block 218 where applicable. Accounting for conditional statements is also optionally addressed in blocks 308, 310 in FIG. 3, and optionally within blocks 410 and 412 in FIG. 4.

Comparing FIGS. 7 and 8, one sees that the modified SQL resulting from the second modified SQL block diagram (FIG. 4), applies the conditional CASE WHEN statements within the CTE, and thus they are only computed once, whereas the first modified SQL block diagram (FIG. 3), applies the CASE WHEN statements within each sub query, meaning that these statements are executed many times, especially where the number of source tables is much larger than two. In other words, the CTE contains the actual conditional column-what the user intends to do, and the subquery that consumes the CTE and corrects double counting in the condition, creates a second condition. This second condition is used to correct the first condition. For instance, the first condition can be seen in the example of FIG. 8 as the two CASE WHEN statements, while the second condition is referenced throughout the main query (Block 804). The same goes for the LEFT OUTER JOIN function, which occurs only once, in the CTE, in FIG. 8, but occurs once for every sub query in FIG. 7. Thus, one sees that use of the CTE in the second modified SQL presents significant advantages over the first modified SQL as the number of source data tables increases.

FIG. 3 illustrates a first block diagram of modified SQL that can be used to avoid double counting errors. In particular, the first modified SQL includes a data selection subquery (Block 312 and 314) for each of source data tables 1-n. This subquery can use a DISTINCT or SELECT DISTINCT function to avoid double counting errors in its output. Condition correcting subqueries (Block 308 and 310) can encompass the data selection subqueries when applicable, one for each of source data tables 1-n. An aggregation subquery (Blocks 304 and 306) can execute over the data selection subquery (Block 312 and 314), and optionally the condition correcting subquery (Block 308 and 310), for each of tables 1-n. Finally, a main query can be performed over a join of all the aggregating subqueries (Block 302).

FIG. 4 illustrates a second block diagram of modified SQL that can be used to avoid double counting errors. In particular, the first modified SQL includes a CTE (Block 402) that selects all data, including all joins, filters, and unique keys, of source data tables having aggregations. The modified SQL can include a data selection subquery (Blocks 410 and 412) for each of source data tables 1-n, where these selections are made from the CTE rather than from the source data tables. These subqueries can optionally include condition corrections. An aggregation subquery (Blocks 406 and 408) can execute over the data selection subquery (Blocks 410 and 412), for each of tables 1-n. Finally, a main query can be performed over a join of all the aggregating subqueries (Block 404).

Figure 9:
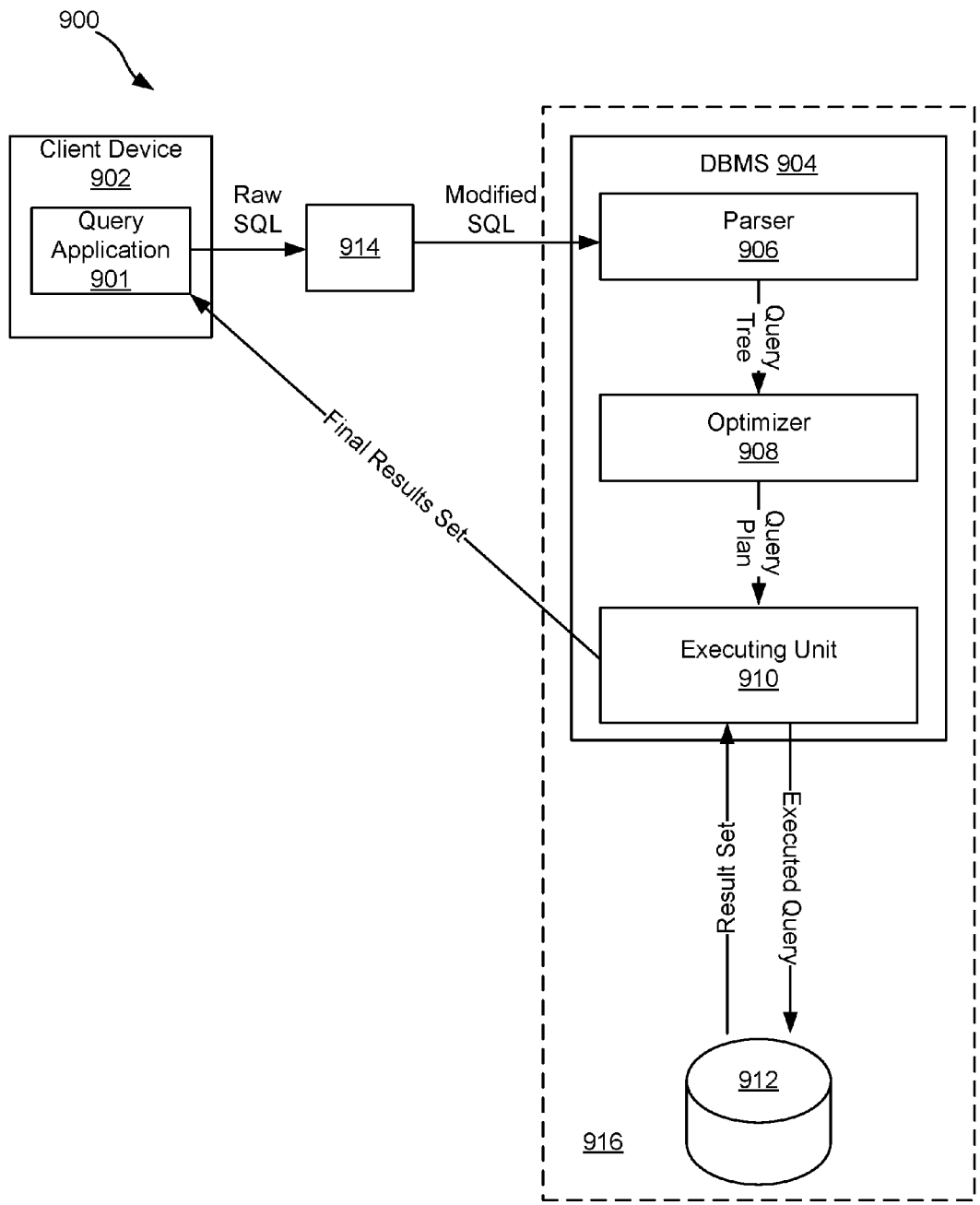
FIG. 9 illustrates a first embodiment of SQL database querying system including a client device, a DBMS, a database, and a double counting error resolver.

FIG. 9 illustrates a SQL database querying system 900 including a client device 902, a DBMS 904, a database 912, and a double counting error resolver 914 ("resolver"). The resolver 914 can be arranged between the client device 902 and the DBMS 904, and can be hosted on a standalone device/server or can be hosted on the client device 902 (see e.g., FIG. 10). The resolver 914 is typically not part of the DBMS 904.

Figure 12:
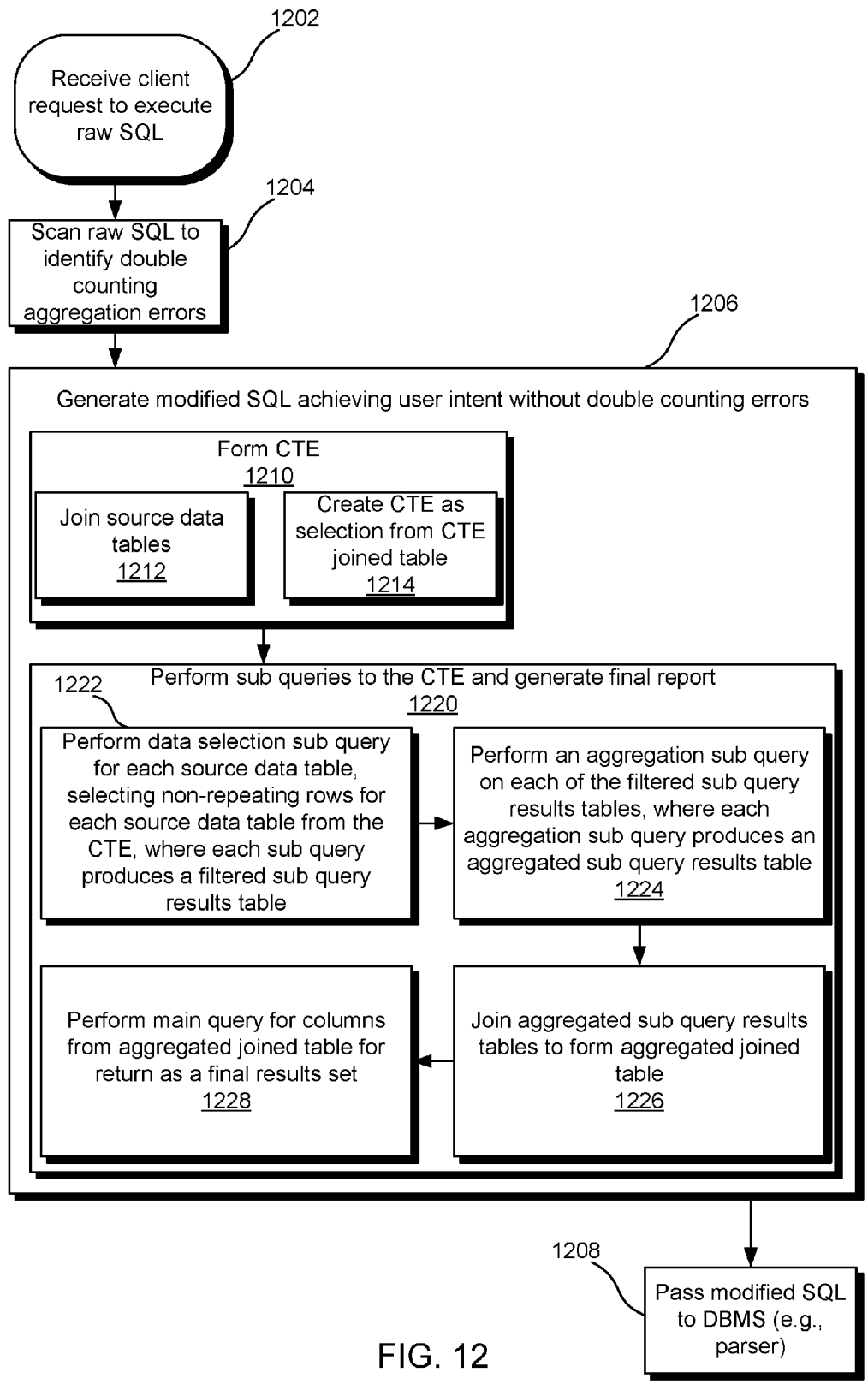
FIG. 12 illustrates a method of generating a modified SQL from raw SQL in order to avoid double counting aggregation errors.

The following details of the system 900 (and alternatively 1000) will be described in combination with the methods illustrated in FIG. 12. The resolver 914 has an input for receiving a client device request to execute a raw SQL query (Block 1202) from the query application 901. The raw SQL query can request a new report, where no report yet exists, or modification to an existing report, where the client already has access to an existing report. For instance, modification may include expanding a row or column or performing an aggregation on a column. The raw SQL query, if executed without modification, would cause the DBMS 904 to access source data tables in the database 912 and return a final results set to the query application 901. However, here, the resolver 914 scans the raw SQL query to identify double counting aggregation errors (Block 1204). In particular, the resolver 914 identifies columns in the one or more source data tables that will see double counting aggregation errors if the raw SQL is run on the source data tables. The resolver 914 then generates modified SQL query that achieves an intent of the raw SQL query (i.e., the user's intent), but without the double counting aggregation errors that would accompany execution of the raw SQL query (Block 1206).

The modified SQL query is then passed via an output of the resolver 914 to the DBMS 904 and in particular to a parser 906 of the DBMS 904. The parser converts the modified SQL query to a query tree (a binary tree data structure which represents the components of the query in a format selected for the convenience of the system) and passes the query tree to an optimizer 908 of the DBMS 904. The optimizer 908 analyzes the query tree to see which of a plurality of query plans would most efficiently execute the query tree, which in turn results in particular access methods being invoked during query execution, and outputs the selected query plan to an execution unit 910. The execution unit 910 translates the selected query plan into executable form for execution and executes the executable form of the query plan (i.e., executes each step in the query plan and interacts with the database 912 to retrieve/modify data). This may involve translating the selected query plan into an execution tree, where each node in the execution tree is an operator. Execution involves communicating with the database 912 and executing the steps/operators in the selected query plan. Thus the execution unit 910 executes the query to the database 912 and receives a result set in response. The execution unit 910 organizes the results set into a final result set and returns the final results set to the query application 901, which formats the final results set into a final report.

In some embodiments, the database 912 resides on a database server separate and distinct from the DBMS 904 and a device hosting the DBMS 904. However, in other instance, the database 912 and DBMS 904 reside on the same optional database server 916. Typically the client device 902 and resolver 914 are coupled via a network connection such as a wide area connection (WAN) or a local area connection (LAN). Where the resolver 1014 resides on the client device 1002, other than a LAN connection may be made between these two. Details of the resolver 914/1014 are described below with reference to FIG. 11.

Figure 10:
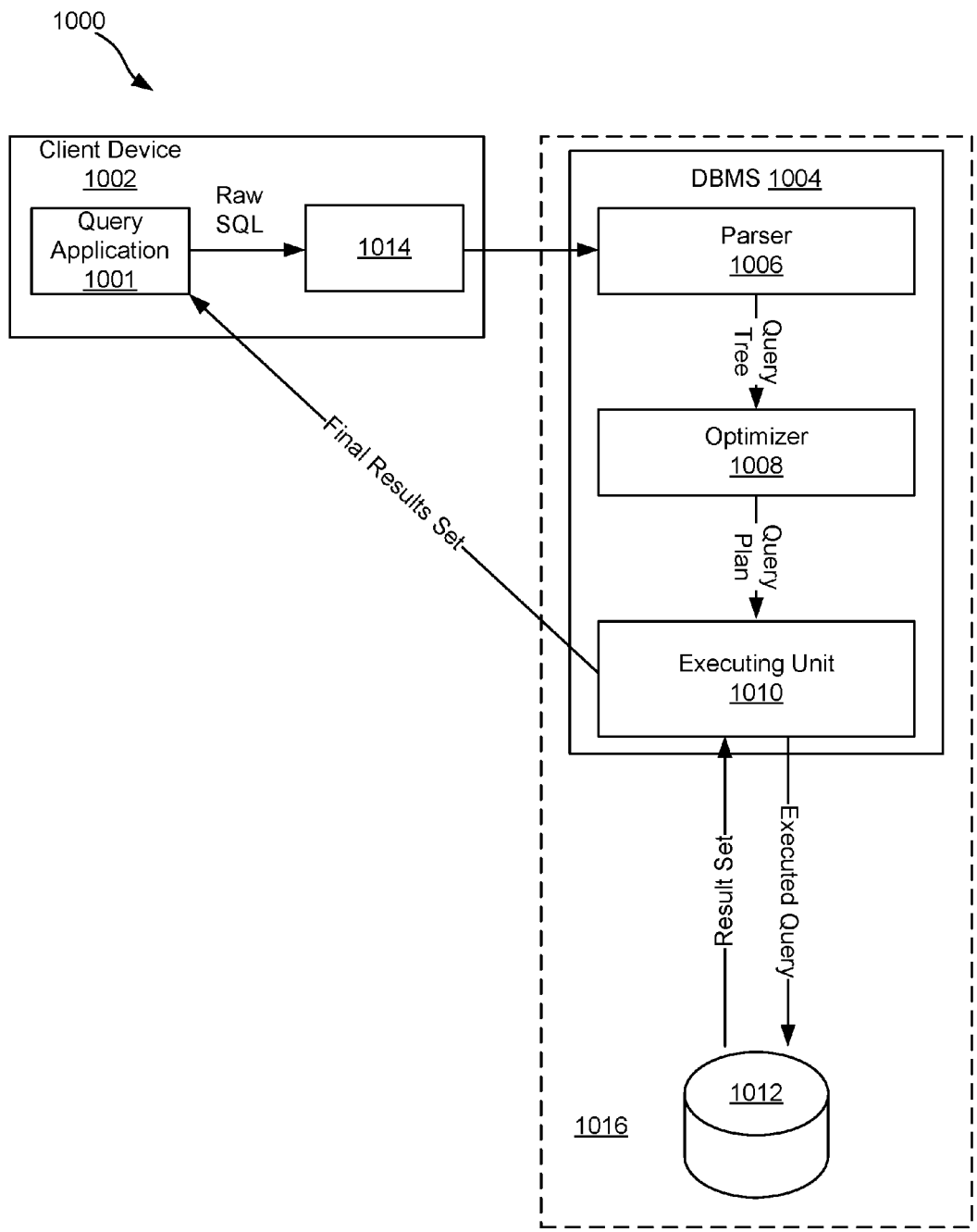
FIG. 10 illustrates a second embodiment of a SQL database querying system including a client device, a DBMS, a database, and a double counting error resolver.
Figure 11:
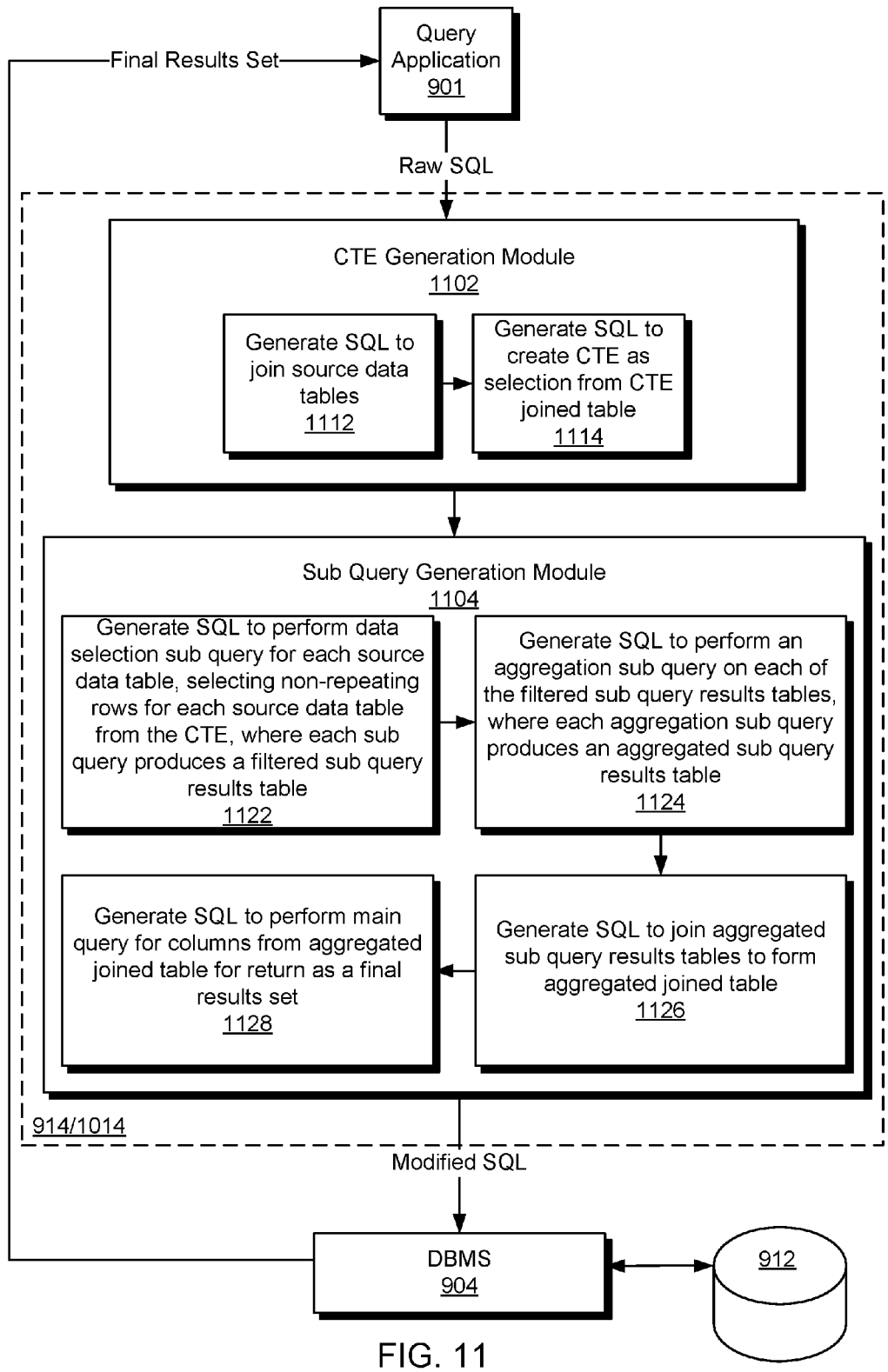
FIG. 11 illustrates a detailed view of the resolver of FIGS. 9 and 10.

FIG. 11 provides details of the resolver 914 shown in FIGS. 9 and 10. As noted above, the resolver 914 can receive at an input the raw SQL query from the query application

901. The resolver can carry out functions described throughout this disclosure via a CTE generation module 1102 (Block 1210) and a sub query generation module 1104 (Block 1220). As noted earlier, the resolver 914 is configured to receive raw SQL, scan the raw SQL to determine if execution of the raw SQL will or could result in at least one double counting aggregation errors, and if so, generates a modified SQL that achieves an intent of the raw SQL, but without erroneous results. While there are numerous methods to generate such a modified SQL, FIG. 11 illustrates modules that do so using a CTE. In particular, the CTE generation module 1102 is configured to generate a portion of the modified SQL that creates a CTE that sub queries can be performed over. The sub query generation module 1104 creates a portion of the modified SQL that creates sub queries that can be executed over the CTE.

More specifically, the CTE generation module 1102 can include a generate SQL to join source data tables sub module 1112 (Block 1212) and a generate SQL to create a CTE as a selection from the CTE joined table 1114 (Block 1214).

The sub query generation module 1104 can include a generate SQL to perform data selection sub query for each source data table, selecting non-repeating rows for each source data table from the CTE sub module 1122 (Block 1222). The modified SQL that this module 1122 generates executes sub queries that produce a filtered sub query results table. Module 1104 can also include a generate SQL to perform an aggregation sub query on each of the filtered sub query results tables, where each aggregation sub query produces an aggregated sub query results table sub module 1124 (Block 1224). The module 1104 can further include a generate SQL to join aggregated sub query results tables to form aggregated joined table sub module 1126 (Block 1226). The module 1104 can also include a generate SQL to perform main query for columns from aggregated joined table for return as final results set sub module 1128 (Block 1228).

The resolver 914/1014 then passes the modified SQL to the DBMS 904 (Block 1208), which executes the modified SQL query to the database and returns a final results set to the query application 901.

Figure 13:
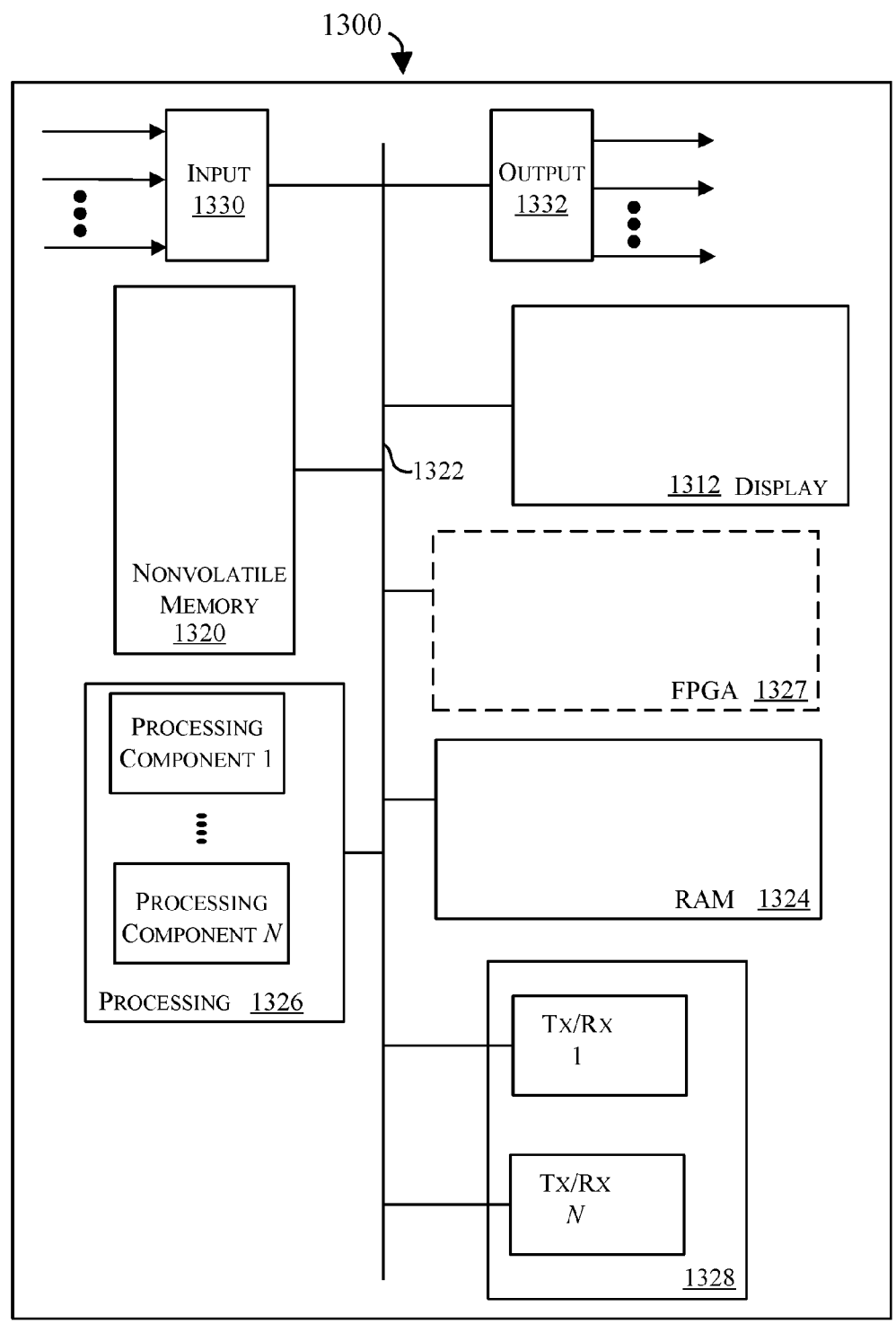
FIG. 13 illustrates a block diagram depicting physical components that may be utilized to realize the resolver according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 13 for example, shown is a block diagram depicting physical components that may be utilized to realize the resolver 914/1014 according to an exemplary embodiment. As shown, in this embodiment a display portion 1312 and nonvolatile memory 1320 are coupled to a bus 1322 that is also coupled to random access memory ("RAM") 1324, a processing portion (which includes N processing components) 1326, an optional field programmable gate array (FPGA) 1327, and a transceiver component 1328 that includes N transceivers. Although the components depicted in FIG. 13 represent physical components, FIG. 13 is not intended to be a detailed hardware diagram; thus many of the components depicted in FIG. 13 may be realized by common constructs or distributed among additional physical components. Moreover, it is contemplated that other existing and yet-to-be developed physical components and architectures may be utilized to implement the functional components described with reference to FIG. 13.

This display portion 1312 generally operates to provide a user interface for a user, and in several implementations, the display is realized by a touchscreen display. The display portion 1312 can be coupled to the client device 902 and can facilitate user interaction with the resolver 914/1014. In general, the nonvolatile memory 1320 is non-transitory memory that functions to store (e.g., persistently store) data and processor-executable code (including executable code that is associated with effectuating the methods described herein). In some embodiments for example, the nonvolatile memory 1320 includes bootloader code, operating system code, file system code, and non-transitory processor-executable code to facilitate the execution of a method described with reference to FIGS. 1, 2, and 12 described further herein.

In many implementations, the nonvolatile memory 1320 is realized by flash memory (e.g., NAND or ONENAND memory), but it is contemplated that other memory types may be utilized as well. Although it may be possible to execute the code from the nonvolatile memory 1320, the executable code in the nonvolatile memory is typically loaded into RAM 1324 and executed by one or more of the N processing components in the processing portion 1326.

The N processing components in connection with RAM 1324 generally operate to execute the instructions stored in nonvolatile memory 1320 to enable scanning of raw SQL, identification of raw SQL that will or could cause double counting aggregation errors, and generation of modified SQL. For example, non-transitory, processor-executable code to effectuate the methods described with reference to FIGS. 1, 2, and 12 may be persistently stored in nonvolatile memory 1320 and executed by the N processing components in connection with RAM 1324. As one of ordinarily skill in the art will appreciate, the processing portion 1326 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1326 may be configured to effectuate one or more aspects of the methodologies described herein (e.g., the methods described with reference to FIGS. 1, 2, and 12). For example, non-transitory processor-readable instructions may be stored in the nonvolatile memory 1320 or in RAM 1324 and when executed on the processing portion 1326, cause the processing portion 1326 to generate modified SQL from raw SQL in order to avoid double counting aggregation errors. Alternatively, non-transitory FPGA-configuration-instructions may be persistently stored in nonvolatile memory 1320 and accessed by the processing portion 1326 (e.g., during boot up) to configure the hardware-configurable portions of the processing portion 1326 to effectuate the functions of the resolver 914/1014.

The input component 1330 operates to receive signals (e.g., data packets making up the raw SQL query) that are indicative of one or more aspects of the raw SQL query. The signals received at the input component may include, for example, data packets making up the raw SQL query. The output component generally operates to provide one or more analog or digital signals to effectuate an operational aspect of the resolver 914/1014. For example, the output portion 1332 may provide the modified SQL described with reference to FIGS. 1-12. When the resolver 914/1014 is realized by an independent server, for example, the output signal may comprise packets representing the modified SQL query. And if the client device 902, resolver 914/1014, and DBMS 904 are on the same device, then the output could be a local signal to the DBMS representing the modified SQL.

The depicted transceiver component 1328 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

It should also be appreciated that use of a CTE makes the conditional correction syntax functional, whereas non-CTE-based methods have a case statement syntax. Additionally, the use of a CTE results in only aggregations that cause double counting triggering a table query. Where a CTE is not used all aggregations trigger a table query if at least one in the source query is affected by double counting.

Other advantages of the CTE-based methods include shorter modified SQL resulting in better system performance due to the fact that less data is generated and transmitted. Shorter SQL also results in the DBMS having to parse, analyze, and optimize less data. The CTE also results in enhanced readability of the modified SQL and better maintainability of the modified SQL. Use of a CTE for raw SQL including conditions may also result in better server performance, depending on DBMS vender, version, and/or configuration. Use of the CTE-based methods also avoids triggering table queries if all aggregations for a given table suffer from double counting errors. Additionally, the use of a CTE means there are fewer table queries and thus faster query execution. In short, the modified SQL is shorter and more quickly generated, transmitted, and executed. Further, the modified SQL formed with a CTE is easier to read, understand, and maintain.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising a double counting resolver module configured for storage on a memory and configured to execute on a processing portion to:
   receive at a first input a request to execute a raw SQL query requesting a new report or modification to an existing report, where the raw SQL query is configured to access one or more source data tables in a database;
   scan the raw SQL query and identify columns in the one or more source data tables that will see double counting aggregation errors when the raw SQL query is run on them;
   generate a modified SQL query that achieves an intent of the raw SQL query but without the double counting aggregation errors, wherein the modified SQL causes the processor to perform the following:
   (1) form a common table expression (CTE) by:
      joining the one or more source data tables to form a CTE joined table; and
      creating the CTE as a selection from the CTE joined table; and
   (2) perform sub queries to the CTE including:
      performing a data selection sub query for each source data table, selecting non-repeating rows for each source data table from the CTE, where each sub query produces a filtered sub query results table; and
      performing an aggregation sub query on each of the filtered sub query results tables, where each aggregation sub query produces an aggregated sub query results table;
   (3) joining the aggregated sub query results tables to form an aggregated joined table; and
   (4) perform a main query for columns from the aggregated joined table for return as the final results set.

2. The system of claim 1, wherein the data selection sub query uses a SELECT DISTINCT function.

3. The system of claim 1, wherein the data selection sub query includes (1) all un-aggregated columns in a selected source data table corresponding to the data selection sub query (210), (2) all columns required for aggregation of the selected source data table corresponding to the data selection sub query (212), and (3) all unique key columns from the CTE (214).

4. The system of claim 3, where the data selection sub query uses a DISTINCT function to distinguish between rows in the CTE that are distinct based on the unique key columns.

5. The system of claim 1, wherein identifying columns in the one or more source data tables that will see double counting aggregation errors, includes comparing data relationships between all the source data tables referenced in the raw SQL query, comparing primary keys against join criteria, and if the comparing determines a one-to-many or many-to-many relationship between a given table and any other table, then a corresponding column is identified as being affected by a double counting aggregation.

6. The system of claim 1, wherein when a source data table does not have unique keys, a second CTE can be created containing all columns requested by the raw SQL query, stripped of any aggregations, and including a "Table*" expression added to the second CTE in the place of unique keys.

7. The system of claim 1, wherein the main query includes adding all un-aggregated columns from one of the source data tables to the final results set and adding all aggregated columns from the aggregated joined table to the final results set.

8. A method comprising:
  receiving a raw SQL query requesting a new report or modification to an existing report, where the raw SQL query is to be applied to one or more source data tables;
  scanning the raw SQL query and identify columns in the one or more source tables that will see double counting aggregation errors when the raw SQL query is run on them;
  generating a modified SQL query that achieves an intent of the raw SQL query but without the double counting aggregation errors, wherein the modified SQL includes:
    (1) forming a common table expression (CTE) including:
      joining the one or more source data tables to form a joined table; and
      creating the CTE as a selection from the joined table; and
    (2) performing sub queries to the CTE including:
      performing a data selection sub query for each source data table selecting non-repeating rows for each source data table from the CTE, where each sub query produces a filtered sub query results table; and
      performing aggregation sub queries on the filtered sub query results tables, where each aggregation sub query produces an aggregated sub query results table;
    (3) joining the aggregated sub query results tables to form a joined table; and
    (4) performing a main query for columns from the joined table for display as the final results set.

9. The method of claim 8, wherein the data selection sub query uses a SELECT DISTINCT function.

10. The method of claim 8, wherein the data selection sub query includes (1) all un-aggregated columns in a selected source data table corresponding to the data selection sub query (210), (2) all columns required for aggregation of the selected source data table corresponding to the data selection sub query (212), and (3) all unique key columns from the CTE (214).

11. The method of claim 10, where the data selection sub query uses a DISTINCT function to distinguish between rows in the CTE that are distinct based on the unique key columns.

12. The method of claim 8, wherein identifying columns in the one or more source data tables that will see double counting aggregation errors, includes comparing data relationships between all the source data tables referenced in the raw SQL query, comparing primary keys against join criteria, and if the comparing determines a one-to-many or many-to-many relationship between a given table and any other table, then a corresponding column is identified as being affected by a double counting aggregation.

13. The method of claim 8, wherein when a source data table does not have unique keys, a second CTE can be created containing all columns requested by the raw SQL query, stripped of any aggregations, and including a "Table*" expression added to the second CTE in the place of unique keys.

14. The method of claim 8, wherein the main query includes adding all un-aggregated columns from one of the source data tables to the final results set and adding all aggregated columns from the aggregated joined table to the final results set.

15. A non-transitory, tangible computer readable storage medium, encoded with processor readable instructions to perform a method for modifying a SQL query to avoid double counting aggregation errors, the method comprising:
  (1) forming a common table expression (CTE) including:
    joining the one or more source data tables to form a joined table; and
    creating the CTE as a selection from the joined table; and
  (2) performing sub queries to the CTE to generate the final results set including:
    performing a data selection sub query for each source data table selecting non-repeating rows for each source data table from the CTE, where each sub query produces a filtered sub query results table; and
    performing aggregation sub queries on the filtered sub query results tables, where each aggregation sub query produces an aggregated sub query results table;
  (3) joining the aggregated sub query results tables to form a joined table; and
  (4) performing a main query for columns from the joined table for display as the final results set.

16. The non-transitory, tangible computer readable storage medium of claim 15, wherein the data selection sub query uses a SELECT DISTINCT function.

17. The non-transitory, tangible computer readable storage medium of claim 15, wherein the data selection sub query includes (1) all un-aggregated columns in a selected source data table corresponding to the data selection sub query (210), (2) all columns required for aggregation of the selected source data table corresponding to the data selection sub query (212), and (3) all unique key columns from the CTE (214).

18. The non-transitory, tangible computer readable storage medium of claim 15, where the data selection sub query uses a DISTINCT function to distinguish between rows in the CTE that are distinct based on the unique key columns.

19. The non-transitory, tangible computer readable storage medium of claim 18, wherein identifying columns in the one or more source data tables that will see double counting aggregation errors, includes comparing data relationships between all the source data tables referenced in the raw SQL query, comparing primary keys against join criteria, and if the comparing determines a one-to-many or many-to-many relationship between a given table and any other table, then a corresponding column is identified as being affected by a double counting aggregation.

20. The non-transitory, tangible computer readable storage medium of claim 15, wherein when a source data table does not have unique keys, a second CTE can be created containing all columns requested by the raw SQL query, stripped of any aggregations, and including a "Table*" expression added to the second CTE in the place of unique keys.

21. The non-transitory, tangible computer readable storage medium of claim 15, wherein the main query includes adding all un-aggregated columns from one of the source data tables to the final results set and adding all aggregated columns from the aggregated joined table to the final results set.

* * * * *